UNITED STATES PATENT OFFICE.

HUGO GELDERMANN, OF BERLIN, GERMANY, ASSIGNOR TO ACTIEN GESELLSCHAFT FÜR ANILIN FABRIKATION, OF SAME PLACE.

BLUE DISAZO DYE.

SPECIFICATION forming part of Letters Patent No. 676,495, dated June 18, 1901.

Application filed March 26, 1901. Serial No. 52,898. (No specimens.)

*To all whom it may concern:*

Be it known that I, HUGO GELDERMANN, of Berlin, in the Kingdom of Prussia, German Empire, have invented new and useful Improvements in Blue Disazo Dyes; and I do hereby declare that the following is a full, clear, and exact description thereof, which will enable others skilled in the art to which it appertains to make and use the same.

My invention relates to the production of a new disazo dye directly dyeing cotton which contains as end component $beta_1$-naphthol-$beta_3$-sulfonic acid, as middle component $alpha_3$-naphthylamin-$beta_3$-sulfonic acid, (Cleve's acid,) and as first component the alkyl ether of para-diamido-para-cresol, represented by the formula:

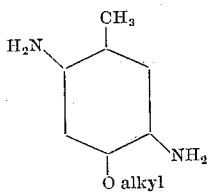

The following example shows how the production of my new dyestuff may be best carried out, the parts being by weight: 18.2 parts of the methyl ether of nitroamido-para-cresol ($CH_3 : NH_2 : NO_2 : OCH_3 = 1:3:6:4$) are dissolved in water and thirty parts of concentrated hydrochloric acid, and the solution obtained is diazotized with seven parts of sodium nitrite at low temperature. The diazo solution is allowed to run into a refrigerated aqueous solution of twenty-four parts of $alpha_1$-naphthylamin-$beta_3$-sulfonic acid and eighteen parts of sodium carbonate while stirring well. The amidoazo compound thus formed separates after the addition of forty-eight parts of concentrated hydrochloric acid. The mass is then refrigerated by the addition of crushed ice and diazotized once more by means of 7.7 parts of sodium nitrite. The diazo-azo compound thus produced separates as a blackish-brown precipitate. It is stirred into a solution prepared by dissolving in water twenty-four parts of $beta_1$-naphthol-$beta_3$-sulfonic acid and 27.5 parts of sodium carbonate, and stirring is continued for about twelve hours until the formation of the dyestuff is completed. Finally, in order to convert the nitro group into an amido group sodium sulfid is added to the mass and the mixture is stirred at moderate temperature until the reduction is completed. The new disazo dyestuff is then salted out, filtered, pressed, and dried. It forms in the dry state a dark powder of metallic luster, almost insoluble in alcohol, and easily soluble in hot or cold water to a violet-red solution. The coloration of the aqueous solution remains unchanged by the addition of sodium carbonate. It is changed to a bluish violet by the addition of caustic-soda lye. An excess of this agent produces a dark bluish-violet precipitate. By the addition of hydrochloric acid the solution assumes a somewhat more reddish coloration. By an excess of hydrochloric acid red-violet flakes will separate. Acetic acid does not effect any change of the coloration.

The dye dissolves in concentrated sulfuric acid, forming a clear indigo-blue solution, which on dilution with ice-water becomes first violet red, then red, and separates, finally, a violet-red precipitate.

The dye produces on unmordanted cotton from a bath containing soap or common salt grayish-violet shades, which by a subsequent diazotation on the fiber and development with beta-naphthol are transformed into a fine indigo blue distinguished by its remarkable fastness.

In the preceding example for the $alpha_1$-naphthylamin-$beta_3$-sulfonic acid may be substituted the $alpha_1$-naphthylamin-$beta_4$-sulfonic acid or a mixture of both these acids without essentially changing the result.

Having thus described my invention and in what manner the same is to be performed, what I claim is—

The new disazo dye containing as first component the 6.3-diamido-para-cresol-methyl ether represented by the formula:

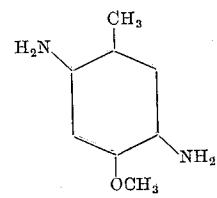

as middle component $alpha_1$-naphthylaminbeta$_3$-sulfonic acid and as end component beta$_1$-naphthol-beta$_3$-sulfonic acid; said dye forming in the dry state a dark powder of metallic luster, almost insoluble in alcohol, easily soluble in hot or cold water forming a violet-red solution; the aqueous solution remaining unchanged by the addition of sodium-carbonate solution or acetic acid; assuming a bluish-violet coloration on the addition of a small quantity of caustic-soda lye and a somewhat more reddish coloration on the addition of hydrochloric acid; the dye being precipitated from its aqueous solution by an excess of caustic-alkali lye or by an excess of hydrochloric acid in the form of bluish-violet respectively red-violet flakes; the dye dissolving in concentrated sulfuric acid to an indigo-blue solution which on dilution with ice-water becomes first violet, then red and separates finally a violet-red precipitate; the dye producing on unmordanted cotton from a bath containing soap or common salt grayish-violet shades which by a subsequent diazotation on the fiber and development with beta-naphthol are transformed into a fine indigo blue of remarkable fastness.

In witness whereof I have hereunto signed my name, this 9th day of March, 1901, in the presence of two subscribing witnesses.

HUGO GELDERMANN.

Witnesses:
HENRY HASPER,
WOLDEMAR HAUPT.